(12) United States Patent
Itzhak et al.

(10) Patent No.: US 8,007,689 B2
(45) Date of Patent: Aug. 30, 2011

(54) LIQUID COMPOSITION SUITABLE FOR USE AS A CORROSION INHIBITOR AND A METHOD FOR ITS PREPARATION

(75) Inventors: David Itzhak, Omer (IL); Sharon Krumbein Rubin, Kibutz Na'an (IL); Arieh Kampf, Tel Aviv (IL); Vered Atiya Zuckerman, Bet Shikma (IL); Mira Bergstein Freiberg, Omer (IL)

(73) Assignee: Bromine Compounds Ltd., Be'Er Sheva (IL)

( * ) Notice: Subject to any disclaimer, the term of this patent is extended or adjusted under 35 U.S.C. 154(b) by 87 days.

(21) Appl. No.: 12/222,605

(22) Filed: Aug. 12, 2008

(65) Prior Publication Data

US 2009/0050853 A1 Feb. 26, 2009

Related U.S. Application Data

(63) Continuation-in-part of application No. PCT/IL2007/000192, filed on Feb. 12, 2007.

(30) Foreign Application Priority Data

| Feb. 13, 2006 | (IL) | 173706 |
|---|---|---|
| Aug. 13, 2007 | (IL) | 185236 |
| Oct. 30, 2007 | (IL) | 187047 |
| Jan. 29, 2008 | (IL) | 189119 |

(51) Int. Cl.

| C09K 3/00 | (2006.01) |
|---|---|
| C23F 11/00 | (2006.01) |
| C23F 11/04 | (2006.01) |
| C23F 11/12 | (2006.01) |
| C23F 11/14 | (2006.01) |
| C23F 11/18 | (2006.01) |
| C23G 1/06 | (2006.01) |

(52) U.S. Cl. ........ 252/389.54; 252/387; 252/394; 252/396; 507/243; 507/266; 507/275

(58) Field of Classification Search ........ 507/243, 507/275; 252/389.54
See application file for complete search history.

(56) References Cited

U.S. PATENT DOCUMENTS

| 2,715,605 A | 8/1955 | Goerner | |
|---|---|---|---|
| 3,079,345 A * | 2/1963 | Monroe et al. | 507/248 |
| 3,154,544 A | 10/1964 | Langdon | |
| 3,200,604 A | 8/1965 | Greeley et al. | |
| 3,434,971 A * | 3/1969 | Atkins | 507/225 |
| 4,292,183 A | 9/1981 | Sanders | |
| 4,304,677 A | 12/1981 | Stauffer et al. | |
| 4,400,562 A | 8/1983 | Wagaman et al. | |
| 4,444,668 A * | 4/1984 | Walker et al. | 507/240 |
| 4,498,997 A | 2/1985 | Walker | |
| 4,501,889 A | 2/1985 | Wells et al. | |
| 4,522,658 A | 6/1985 | Walker | |
| 4,536,302 A | 8/1985 | Augsburger et al. | |
| 4,539,122 A | 9/1985 | Son et al. | |
| 4,728,446 A | 3/1988 | Doty et al. | |
| 4,784,778 A * | 11/1988 | Shin | 507/258 |
| 4,784,779 A | 11/1988 | Dadgar | |
| 4,784,796 A | 11/1988 | Treybig et al. | |
| 4,956,076 A * | 9/1990 | Awbrey | 208/291 |
| 4,971,709 A | 11/1990 | Tillis et al. | |
| 4,971,718 A | 11/1990 | McCullough et al. | |
| 4,980,074 A | 12/1990 | Henson et al. | |
| 5,261,491 A * | 11/1993 | Stewart et al. | 166/279 |
| 5,366,643 A | 11/1994 | Walker | |
| 5,411,670 A | 5/1995 | Walker | |
| 5,531,937 A | 7/1996 | Minevski | |
| 5,697,443 A * | 12/1997 | Brezinski et al. | 166/307 |
| 5,763,368 A * | 6/1998 | Brezinski | 507/240 |
| 5,976,416 A * | 11/1999 | Brezinski | 252/389.62 |
| 6,192,987 B1 | 2/2001 | Funkhouser et al. | |
| 6,511,613 B1 * | 1/2003 | Cizek et al. | 252/396 |
| 2004/0013807 A1 * | 1/2004 | Chase et al. | 427/365 |
| 2004/0138071 A1 * | 7/2004 | Gupta et al. | 507/200 |
| 2005/0067164 A1 * | 3/2005 | Ke et al. | 166/304 |
| 2005/0169794 A1 | 8/2005 | Welton et al. | |
| 2006/0264335 A1 * | 11/2006 | Penna et al. | 507/244 |
| 2008/0274013 A1 * | 11/2008 | Stevens et al. | 422/7 |

FOREIGN PATENT DOCUMENTS

| DE | 2932560 | | 10/2010 |
|---|---|---|---|
| EP | 0471400 | | 2/1992 |
| EP | 0489498 | | 6/1992 |
| EP | 1038936 | | 8/2004 |
| GB | 2027686 | A * | 2/1980 |
| WO | WO 2007093987 | | 8/2007 |

OTHER PUBLICATIONS

Ezzat et al; Solids-Free, High Density Brines for Packer-Fluid Applications, Journal of Petroleum Technology, pp. 491-498, Apr. 1998.*
Stevens et al; Oilfield Environment-Induced Stress Corrosion Cracking of CRAs in Completion Brines; SPE Annual Technical Conference and Exhibition, Houston, TX; SPE 90188: Sep. 2004.*
Ke et al; Thermal Decomposition of Thiocyanate Corrosion Inhibitors—A Potential Problem for Successful Well Completions; SPE Annual Technical Conference and Exhibition on Formation Damage Control, Lafayette, LA; SPE 98302; Feb. 2006.*
Mack et al; Stress Corrosion Cracking of a Cold Worked 22 Cr Duplex Stainless Steel Production Tubing in a High Density Clear Brine CaCl Packer Fluid; NACE International; Paper No. 02067; 2002.*
Hudson, T.E.; Corrosivity of Heavyweight Brines—Understanding It and Techniques Operators Can Use to Control It; 18th Annual OTC, Houston, TX; OTC 5266; May 1986.*
International Search Report issued for PCT Application No. PCT/IL2008001110, dated Feb. 16, 2010.
International Search Report for PCT/IL2007/000192, mailed Jun. 13, 2007.

* cited by examiner

Primary Examiner — Mark Eashoo
Assistant Examiner — Peter F Godenschwager
(74) Attorney, Agent, or Firm — Nixon & Vanderhye P.C.

(57) ABSTRACT

A liquid composition comprising a high-capacity aqueous carrier in which (i) a metalloid compound selected from the group consisting of antimony and germanium compounds and (ii) morpholine or derivative thereof are dissolved in the presence of (iii) unsaturated alcohol and (iv) water-soluble organic acid having reducing capacity, wherein the total concentration of said four components is preferably not less than 5% relative to the total weight of the composition. The composition is useful as a corrosion inhibitor. Also provided is a process for preparing the composition.

3 Claims, No Drawings

LIQUID COMPOSITION SUITABLE FOR USE AS A CORROSION INHIBITOR AND A METHOD FOR ITS PREPARATION

This application is a Continuation-In-Part of the U.S. national phase of International Application No. PCT/IL2007/000192, filed 12 Feb. 2007, which designated the U.S. and claims priority to IL Application No. 173706, filed 13 Feb. 2006, IL Application No. 185236, filed 13 Aug. 2007; IL Application No. 187047, filed 30 Oct. 2007, IL Application No. 189119, filed 29 Jan. 2008, the entire contents of each of which are hereby incorporated by reference.

FIELD OF THE INVENTION

This invention is pertaining primarily to corrosion inhibitors, especially to corrosion inhibitors for concentrated salt solutions. It is particularly useful for certain oil drilling and oil production systems, and for selected absorption refrigeration systems wherein zinc bromide and mixtures of zinc bromide and other salt brines (such as calcium bromide) are basic components, and when the protection of metallic surfaces at elevated temperatures is critical.

BACKGROUND OF THE INVENTION

Well-drilling fluids and especially completion, packer, and workover fluids are preferred in the form of clear salt aqueous solutions also commonly referred to as "clear brines". Those fluids are called in accordance with the phases of the hydrocarbon extraction process in which they are employed: completion fluids are those used after the well has been drilled and prior to the initiation of production; packer fluids are utilized as fluids in the annulus of the production tubing; and workover fluids are used during remedial operations on the well. Of the multiple functions of the fluid used in the well, a crucial one is balancing formation pressures to prevent uncontrolled influx of underground fluids, which may result in a blowout. When formation pressure is high, as in the deeper wells, use of zinc bromide is particularly useful, due to its high density in concentrated solutions. While saturated brine density is 1.20 g/cm$^3$ for NaCl solutions, 1.46 for CaCl$_2$, 1.50 for NaBr and 1.71 for CaBr$_2$, the density of ZnCl$_2$ brine at saturation attains 2.14 and the density of ZnBr$_2$ is as high as 2.65 g/cm$^3$.

When in use, a technical problem associated with the use of heavy brine fluids is their high corrosiveness, especially toward carbon steels, which are widely used in the construction of hydrocarbon wells, and particularly at the elevated temperatures typically encountered in deep wells.

Known corrosion inhibitors, such as film-forming amines, which have been used with high-density brines described in U.S. Pat. No. 4,304,677 and U.S. Pat. No. 4,292,183 do not generally provide adequate protection from corrosion at those higher temperatures associated with the deep wells in which high-density brines are normally employed.

British Patent No. 2,027,686, U.S. Pat. Nos. 4,536,302, 4,728,446, 4,784,779 and 4,980,074 have disclosed use of sulfur compounds as the main inhibitor-formula component that has been typical of the recent known technology. Although the sulfur compounds are efficient corrosion inhibitors, there is an increased risk of stress corrosion cracking. There have been a number of catastrophic stress corrosion failures in the oil industry that have been attributed to sulfur containing corrosion inhibitors. As a result, the industry is seeking effective, non-sulfur corrosion inhibiting formulas.

Some non-sulfur corrosion-inhibition formulas are already known, but they fall short in respect to the effectiveness considered necessary in the industry. Thus, U.S. Pat. No. 4,539,122 describes use of erythorbic acid salts in combination with a molybdate salt, ferrous gluconate, and sodium gluconate. At more than 25 mpy (mili inches per year), the corrosion rate claimed for 18.5 pounds per gallon brines (2.20 g/cm$^3$) at 300 degrees Fahrenheit (F), is too high for the most demanding applications. A somewhat similar inadequacy was noted with U.S. Pat. No. 4,980,074, which describes use of soluble aliphatic or aromatic aldehydes reacted with primary amines, and claims a less than satisfactory corrosion rate of 28 mils per year for a 19.5 pounds per gallon (2.34 g/cm$^3$) brine at 250 degrees F. Only when supported by addition of sulfur compounds was the corrosion rate lowered to a level of 10-13 mpy with the aforementioned brine at 250 degrees F. U.S. Pat. No. 4,971,709 discloses use of some metallic powders as inhibitors for zinc containing brines. The main disadvantage of the method is the very low solubility of those powders, which cause precipitation of particles that might plug or damage a producing formation. Also U.S. Pat. No. 4,539,122, which proposes inhibiting heavy brines with arsenic containing compositions, is handicapped by the accumulative toxicity of arsenic compounds. WO 01/46552 claims use of heteropoly complex anions of transitional metal elements but omits to disclose the actual corrosion rates obtained in application simulations. EP 1038936 discloses the use of ammonia or amines in an amount effective to raise the pH as additives in inhibiting corrosion in brines; however, these additives can interfere with the stability of the brines. Formulas combining antimony with acetylenic alcohols have been proposed, for example in U.S. Pat. Nos. 4,498,997 and 4,522,658, for inhibiting oxidative effects of acidic aqueous environment.

In absorption refrigeration where lithium bromide solution is the preferred fluid, additions of zinc bromide improve the saturation concentration and provide a desirable low vapor pressure at absorber high temperatures. However, such solutions are extremely corrosive and cannot be used in the absence of very efficient corrosion inhibitors. Known additives include molybdates, chromates and nitrates. These additives lessen corrosion, albeit not to a satisfactory level, when significant amounts of zinc bromide are incorporated into the working fluids.

It is, therefore, an object of the present invention to provide a new corrosion inhibitor formulation for reducing corrosion induced by heavy brine fluids.

It is further, an object of the present invention to provide corrosion inhibition mixtures, which are compatible with different applications of working fluids, particularly at elevated temperatures.

It is further another object of the present invention to provide corrosion inhibiting mixtures which reduce corrosion rate to below 25 mpy when comprised in heavy brine fluids.

Another object of the present invention is to provide corrosion inhibiting mixtures which do not cause stress cracking to the apparatus in which they are used.

Still another object of the present invention is to provide use of combinations of corrosion inhibiting compounds in the manufacture of corrosion inhibiting mixtures.

Still another object of the present invention is to provide concentrated aqueous salt solutions that are strongly inhibited to prevent unacceptable levels of corrosion on the metallic apparatus in which they are used.

Still another object of the present invention is to provide concentrated aqueous salt solutions in which corrosion of steel is strongly inhibited.

Another object of the present invention is to provide strongly inhibited formulas of concentrated aqueous salt solutions that would prevent catastrophic sulfide stress cracking to the metallic apparatus in which they are used.

Another object of the present invention is to provide a method to use synergistic corrosion inhibitor formulations that would adapt the level of corrosion protection to the heavy brine fluids.

These and other objects of the present invention shall become clear as the description proceeds.

SUMMARY OF THE INVENTION

The invention provides an antimony-based corrosion inhibitor for reducing metal corrosion induced by salt solutions, comprising an antimony compound and at least two compounds selected from two of the four following compound families: i. morpholine and morpholine derivatives; ii. acetylenic alcohols; iii. ascorbic acid derivatives; and iv. selenium compounds.

Said antimony compound may be selected from antimony trioxide, potassium antimony tartrate, antimony tartrate, and antimony trihalides. Said morpholine derivative may comprise alkylmorpholine derivatives, alkylmorpholine oxides, or other compounds comprising morpholinyl structure in their molecule. Said acetylenic alcohols are preferably selected from 2-propyne alcohol and substituted 2-propyne alcohols. In a preferred embodiment of the invention said acetylenic alcohol is propargyl alcohol. In another preferred embodiment of the invention said acetylenic alcohol is selected from 1-alkyl substituted or 1,1-dialkylsubstituted 2-propyne alcohols, an example being 2-methyl-3-butyn-2-ol. In still another preferred embodiment of the invention said acetylenic alcohol is selected from 3-substituted 2-propyne alcohols, examples being 3-alkyl substituted or 3-hydroxylalkyl substituted 2-propyne alcohols. In other preferred embodiment said acetylenic alcohol is selected from O-substituted 2-propyne alcohols. Said ascorbic acid derivatives may be selected, without being limited to them, from ascorbic acid isomers, esters, and salts thereof. In a preferred embodiment of the invention, the derivatives of ascorbic acid are selected from ascorbic acid, isoascorbic acid, and salts thereof. Said selenium compound is preferably selected from selenium oxide, selenium salts, such as selenium halides, and selenium oxychloride.

A corrosion inhibitor according to the invention is preferably used in a solution comprising a salt selected from zinc bromide, zinc chloride, calcium bromide, calcium chloride, and mixtures thereof. Said metal may be selected from carbon steels and chromium-alloyed steels. An inhibitor according to the invention reduces the rate of corrosion, induced by said salt solution, to below 40 mpy, preferably to below 25 mpy, and still more preferably to below 10 mpy. An inhibitor according to the invention may reduce the rate of corrosion induced by said salt solution to below 5 mpy. Said antimony compound is preferably selected from antimony bromide and antimony chloride. In a preferred embodiment of the invention, the anticorrosive inhibitor comprises an antimony compound and two compounds selected from two different families of the above said four families. In a preferred embodiment of the invention, said two compounds are selected from morpholine, propargyl alcohol, isoascorbic acid, ascorbic acid, and selenium dioxide. In a preferred embodiment of the invention a preferred inhibitor according to the invention may comprise an antimony compound and a compound combination selected from: a) propargyl alcohol, morpholine; b) morpholine, isoascorbic acid; c) propargyl alcohol, isoascorbic acid; and d) propargyl alcohol, selenium dioxide. An inhibitor according to the invention may comprise an antimony compound and three compounds selected from three different families of said four families. Said three compounds may comprise a combination selected from: a) propargyl alcohol, morpholine, selenium dioxide; b) propargyl alcohol, morpholine, isoascorbic acid; and c) morpholine, isoascorbic acid, selenium dioxide. An inhibitor according to the invention may comprise an antimony compound and four compounds selected from four different families of said four families. Said four compounds may be propargyl alcohol, morpholine, selenium dioxide, and isoascorbic acid.

The invention relates to an inhibitor composition, comprising an antimony compound and any combination of two or more compounds selected from the following compound families: i. morpholine and morpholine derivatives; ii. acetylenic alcohols; iii. ascorbic acid derivatives; and iv. selenium compounds; wherein at least two compounds of said combination belong to different families. The inhibitor composition may comprise two or more compounds belonging to the same family. The antimony-based corrosion inhibitor according to the invention essentially comprises a non-sulfur mixture. An antimony-based corrosion inhibitor or an antimony-based anticorrosive composition according to the invention may comprise additional components that improve its anticorrosive or other properties. Advantageously, the inhibitor composition may further comprise an amine. An inhibitor according to the invention is preferably effective in inhibiting or reducing corrosion rate in salt solutions used in hydrocarbon drilling, in completion fluids, packer fluids, and workover fluids. In a preferred embodiment of the invention, the inhibitor is effective in inhibiting or reducing corrosion rate in salt solutions used in absorption refrigeration systems. In another preferred embodiment of the invention, the inhibitor is effective in inhibiting or reducing corrosion rate in heavy brine fluids at elevated temperatures.

The invention is directed to the use of a mixture comprising an antimony compound and at least two compounds selected from at least two of the four following compound families: i. morpholine and morpholine derivatives; ii. acetylenic alcohols; iii. ascorbic acid derivatives; and iv. selenium compounds; in preparing a corrosion inhibitor for reducing or inhibiting corrosion induced by salt solutions. In the use according to the invention, said mixture may, for example, comprise an antimony compound and two compounds selected from morpholine or morpholine derivatives, and acetylenic alcohols, and may reduce the corrosion rate induced by said salt solution to a value of about 40 or lower. Said two compounds may be selected from the following combinations: a) propargyl alcohol, morpholine; b) morpholine, isoascorbic acid; c) propargyl alcohol, isoascorbic acid; and d) propargyl alcohol, selenium dioxide; wherein the rate of corrosion induced by said salt solution may be reduced according to the invention to about 30 mpy or lower. In another preferred use according to the invention, said mixture may comprise an antimony compound and three compounds selected from morpholine or morpholine derivatives, acetylenic alcohols, ascorbic acid derivatives, and selenium compounds. Said three compounds may be selected from morpholine or morpholine derivatives, acetylenic alcohols, ascorbic acid or isoascorbic acid or a salt thereof, and a selenium compound. Said three compounds may be selected from the following combinations: a) propargyl alcohol, morpholine, selenium dioxide; b) propargyl alcohol, morpholine, isoascorbic acid; and c) morpholine, isoascorbic acid, selenium dioxide; wherein the rate of corrosion induced by a salt solution is reduced by using said corrosion inhibitor according to the invention to about 25 mpy or lower. In a preferred embodiment of the invention, the use of said mixture further comprises admixing an amine into said inhibitor mixture or into said brine. In the use of the invention the corrosion inhibitor comprises an antimony compound and a compound combination selected from: a) propargyl alcohol, morpholine, selenium dioxide, isoascorbic acid; and b) propargyl alcohol, morpholine, selenium dioxide, hexamine; wherein the rate of corrosion induced by a salt solution is reduced by the corrosion inhibitor used according to the invention to about 10 mpy or lower. In the use according to the invention, the corrosion inhibitor is essentially a non-sulfur inhibitor. In said use of the invention, the corrosion inhibitor is introduced into a salt solution inducing corrosion, said salt solution comprising, typically, salts selected from zinc bromide, zinc chloride, calcium bromide, calcium chloride, and mixtures thereof. In said use, the corrosion inhibitor is effective in inhibiting or reducing the corrosion rate in salt solutions incorporated in hydrocarbon drilling, completion, production and workover, and in absorption refrigeration systems. Use of the invention comprises an effective corrosion inhibition in salt solutions at elevated temperatures.

The invention further relates to a salt solution comprising a corrosion inhibitor as described above, wherein the corrosion induced by said salt solution is essentially reduced by said corrosion inhibitor. A salt solution according to the invention, having usually a density from about 1.20 to about 2.65 g/cm$^3$, preferably comprises zinc bromide, zinc chloride, calcium bromide, calcium chloride, and mixtures thereof. The salt solution of the invention is usually incorporated in technologies associated with hydrocarbon drilling, completion, production and workover, and absorption refrigeration systems. A salt solution according to the invention is effective in inhibiting corrosion or reducing the rate of corrosion induced by heavy brine fluids at elevated temperatures. Said salt solution comprises a corrosion inhibitor which is essentially a non-sulfur inhibitor. Said salt solution may further comprise an amine.

The invention provides a method of inhibiting metal corrosion in a heavy brine fluid, comprising admixing to said fluid an antimony compound, and two or more compounds selected from at least two of the four following compound families: i. morpholine and morpholine derivatives; ii. acetylenic alcohols; iii. ascorbic acid derivatives; and iv. selenium compounds; wherein said two or more selected compounds belong to at least two of said four families. The invention is also directed to a formulation for use in inhibiting metal corrosion in heavy brine fluids, comprising an antimony compound, and at least two compounds selected from at least two of the four following compound families: i. morpholine and morpholine derivatives; ii. acetylenic alcohols; iii. ascorbic acid derivatives; and iv. selenium compounds. The invention thus relates to a method of inhibiting metal corrosion in concentrated aqueous salt solutions, comprising adding, together with an antimony compound, at least two other compounds, at relatively low concentrations, to the solution, wherein said compounds belong to said compound families. Including an amine may be sometimes useful. Said salt solutions may, in various situations, combine with, without being limited to them, lithium, sodium, potassium, calcium, zinc, chlorides, bromides, acetates, and formates, and more typically will comprise calcium or zinc as cation, and chloride or bromide as anion. Said salt solutions, or heavy brine fluids, as they are in this context interchangeably called in this application, will have densities usually from about 1.20 to about 2.65 g/cm$^3$. Said antimony compound is preferably an antimony halide, such as antimony chloride ($SbCl_3$) or antimony bromide ($SbBr_3$). Said morpholine derivative may, for example, comprise alkylmorpholine derivatives, said acetylenic alcohol may comprise, for example, propyne or butyne derivatives, said ascorbic acid derivative is preferably an isomer or a salt of ascorbic acid. Said selenium compound may comprise a selenium salt or oxide. Optionally includable amine may comprise, for example, a tertiary amine such as hexamine.

The present invention is based on the discovery that mixtures containing an antimony compound together with various combinations of morpholine compounds, antimony compounds, acetylenic alcohols, ascorbic acid derivatives, and selenium compounds, provide good corrosion protection to metallic surfaces of apparatuses being in contact with brines and working fluids, at relatively low concentrations. The corrosion inhibiting mixtures of the invention are particularly useful for heavy brine salts solutions containing zinc bromide and zinc chloride, and especially when used at elevated temperatures. The corrosion protection remains strong at those high temperatures that may be encountered in processes such as hydrocarbon drilling, completion, production and workover, as well as in absorption refrigeration systems. The present invention is further especially based on the discovery that when combined at the right ratios, said abovementioned compounds provide a synergistically enhanced protection to metal surfaces coming in contact with a salt solution, in particular with a concentrated solution containing zinc bromide that was properly modified by adding said synergistic mixtures.

As will be described in greater detail in the following, compounds selected from among four compound families were co-introduced to concentrated aqueous solutions together with antimony compounds to form corrosion inhibiting mixtures of the present invention to be tested. Accordingly, varying corrosion inhibiting rates were obtained, depending on the compounds selection, and on their concentrations. These tests enabled both setting the reduction in corrosion rate for each mixture and diagnosing the synergistic effect taking place in the addition of a compound of a certain family compared to a reference mixture. As will be demonstrated, the mixtures used for corrosion inhibition reduced significantly the rate of corrosion down to only several mpy in certain cases.

The invention relates to an anticorrosive mixture of compounds containing an antimony compound and at least two compounds selected from the following compound families: i) morpholine and morpholine derivatives; ii) acetylenic alcohols; iii) ascorbic acid derivatives; and iv) selenium compounds. Various effective corrosion inhibition combinations may be produced from the compounds belonging to said families, all being included within the spirit of the present invention. A combination of compounds within the scope of the invention may comprise more than one compound of one family. A corrosion inhibitor according to the invention is preferably used in a brine comprising a salt selected from zinc bromide, zinc chloride, calcium bromide, calcium chloride, and mixtures thereof. Said protected metal may be selected, for example, from carbon steels, chromium-alloyed steels, and stainless steels of various types. The inhibitor of the invention reduces the rate of corrosion induced by said salt solution below 40 mpy, preferably below 25 mpy, and still more preferably below 10 mpy. Various combinations of the compounds according to the invention may provide in various environments anticorrosive inhibition comprising values below 5 mpy. Said antimony compound is preferably an antimony halide, such as antimony chloride or antimony bromide. Said morpholine derivative may, for example, comprise optionally substituted morpholine (for the sake of brevity, the term "morpholine derivative" may be used for "morpholine or its derivative"), said acetylenic alcohol may comprise, for example, propyne derivatives, such as 2-methyl-3-butyn-2-ol, 4-methyl-1-pentyn-3-ol, 1-hexyn-3-ol, 4-ethyl-1-octyn-3-ol, propargyl alcohol, alkoxylated propargyl alcohols, benzylbutynol, 1-ethynylcyclohexanol, 5-decyne-4,7-diol, and mixtures thereof. Said ascorbic acid derivative is preferably an isomer or a salt of ascorbic acid. Optionally includable amine may comprise, for example, a tertiary amine such as hexamine.

The invention provides a formulation to be added to brines to inhibit the corrosion rate, which formulation may be a concentrated solution or a suspension of said compounds of the mentioned four families. Said formulation may alternatively be a solid comprising said compounds.

It is understood that said compounds may be present in various consistencies in an effective mixture or formulation, and that they may interact or even react in the mixture to form adducts or salts or complexes or other products of such interactions; the words mixture and formulation are used interchangeably in that context.

In one preferred embodiment of the invention, the corrosion inhibitor of the invention comprises a combination of compounds selected from antimony bromide, antimony chloride, morpholine, propargyl alcohol, isoascorbic acid, hexamine, and selenium dioxide. Said inhibitor comprises at least three compounds selected from three different compound families. In a preferred embodiment, the inhibitor of the invention comprises a combination selected from the group of compound-triplets consisting of antimony bromide, propargyl alcohol, and morpholine; antimony bromide, morpholine, and isoascorbic acid; antimony bromide, propargyl alcohol, and isoascorbic acid; and antimony bromide, propargyl alcohol, and selenium dioxide. In other preferred embodiment of the invention, the anticorrosive inhibitor may comprise four compounds selected from the group of compound-quadruplets consisting of antimony bromide, propargyl alcohol, morpholine, selenium dioxide; antimony bromide, propargyl alcohol, morpholine, isoascorbic acid; and antimony bromide, morpholine, isoascorbic acid, selenium dioxide. An inhibitor according to the invention may comprise more than four compounds selected from antimony compounds and said four compound families. In a preferred embodiment of the invention, the inhibitor is a compound-quintuplet consisting of antimony bromide, propargyl alcohol, morpholine, selenium dioxide, and isoascorbic acid. In another embodiment, the inhibitor is a compound quintuplet consisting of antimony bromide, propargyl alcohol, morpholine, selenium dioxide, and hexamine. It is understood that other combinations, possibly comprising two or more materials belonging to the same family, may be useful in various practical applications.

Preferred examples of mixtures comprising such corrosion inhibiting combinations, will now be described in greater detail.

DESCRIPTION OF THE PREFERRED EMBODIMENTS

To more fully illustrate the present invention, several non-limiting examples are subsequently presented. In determining the corrosion rate shown in the following examples, mild steel C-4130 corrosion coupons were rinsed in acetone, dried and weighed to the nearest 0.1 mg. One or two coupons were placed into a glass container containing 125 ml or 250 ml of the test fluid to thereby provide a volume to surface area ratio of 20 ml per sq. in. or in 200 ml of the test fluid to thereby provide a volume to surface area ratio of 45.6 ml per sq. in. The glass container holding the coupons and the test fluid was then placed into an aging cell and pressurized to 500 psi with an inert medium such as nitrogen. The cell was next placed in an oven at the desired temperature for the required test period. When not indicated otherwise, the temperature was 177° C. (350° F.) and the test duration was 7 days. After aging, the coupons were removed from the cell, brushed and rinsed sequentially in hot water and acetone. They were later dried, re-weighed to the nearest 0.1 mg and the weight-loss was calculated. For corrosion rate calculations the formula given below was used:

$$\mathrm{mpy} = 534 W/DAT$$

where mpy=corrosion rate in mili inches per year
W=weight loss, mg
D=density of coupon, g/cm$^3$
A=area of coupon, sq. in.
T=exposure (aging) time, hr As mentioned above, antimony compounds and compounds of four families were used in preparing corrosion inhibiting mixtures, namely morpholine and morpholine derivatives, acetylenic alcohols, ascorbic acid derivatives such as isomers or salts, and selenium compounds, optionally using also amines. Without being limited to them, the following compounds may be included in the inhibiting mixtures: optionally substituted morpholine, antimony chloride, antimony bromide, antimony trioxide, potassium antimony tartrate, antimony tartrate, propargyl alcohol, 2-methyl-3-butyn-2-ol, 4-methyl-1-pentyn-3-ol, 1-hexyn-3-ol, 4-ethyl-1-octyn-3-ol, propargyl alcohol, alkoxylated propargyl alcohols, benzylbutylol, 1-ethynylcyclohexanol, 5-decyne-4,7-diol, isoascorbic acid, ascorbic acid, hexamine, selenium dioxide, and selenium chloride.

Effective corrosion inhibiting compositions may be obtained by combining different compounds detailed above, particularly morpholine, antimony chloride or antimony bromide, propargyl alcohol, isoascorbic acid, and selenium dioxide, possibly with addition of an amine such as hexamine.

In one aspect of the present invention is provided a three component composition for inhibiting corrosion in salt solutions. Particular examples of such three components compositions are as follows:

A composition that contains SbBr$_3$, propargyl alcohol, and selenium dioxide.

A composition that contains morpholine, SbBr$_3$, and propargyl alcohol.

A composition that contains SbBr$_3$, propargyl alcohol, and isoascorbic acid.

In still another aspect, the present invention provides a four component composition for inhibiting corrosion in salt solutions. Particular examples of such four components compositions are as follows:

A composition that contains morpholine, SbBr$_3$, propargyl alcohol, and isoascorbic acid.

A composition that contains morpholine, SbBr$_3$, propargyl alcohol, and selenium dioxide.

A composition that contains morpholine, SbBr$_3$, isoascorbic acid, and selenium dioxide.

In still another aspect, the present invention provides a composition for inhibiting corrosion in salt solutions comprising more than four components. Particular examples of such compositions are as follows:

A composition that contains morpholine, SbBr$_3$, propargyl alcohol, selenium dioxide, and hexamine.

A composition that contains morpholine, SbBr$_3$, propargyl alcohol, isoascorbic acid, and selenium dioxide.

From the viewpoint of corrosion inhibition, antimony bromide may usually be replaced by antimony chloride.

A suitable combination of at least three components selected from antimony compounds and the four families according to the invention may provide the desired corrosion inhibitor for various practical situations, as a skilled person will appreciate.

In a preferred embodiment of the invention, a salt solution containing zinc bromide at 10 wt. % to 82 wt. %, preferably 30 wt. % to 78 wt. %, and/or calcium bromide at 1 wt. % to 56 wt. %, preferably 15 wt. % to 35 wt. %, and/or calcium chloride at 0 wt. % to 20 wt. % is inhibited by a corrosion inhibitor comprising two or more compounds selected from groups i. to iv. defined above, wherein said salt solution preferably contains less than 1 wt. % of said compounds, for example less than 0.8 wt. %, preferably 0.5 wt % or less. Said compounds constituting the inhibitor may be present in the brine in amounts, e.g., from 50 ppm to 0.5 wt. %. Said corrosion inhibitor preferably reduces the corrosion rate of steel, even at elevated temperatures, wherein said steel may be for example carbon steel, or chromium-alloyed steel, such as 13% chromium steel (Alloy 410).

In still another embodiment of the invention, a salt solution containing zinc bromide at 10 wt. % to 82 wt. %, preferably 30 wt. % to 78 wt. %, and/or calcium bromide at 1 wt. % to 56 wt. %, preferably 15 wt. % to 35 wt. %, and/or calcium chloride at 0 wt. % to 20 wt. % is inhibited by a corrosion inhibitor comprising selenium dioxide, when in contact at 177° C. with carbon steel used in oilfield installation, wherein no more than half a percent of each of said components selected from said four families is added in either solid form or dissolved in a suitable aqueous or organic solvent. It is for those skilled in the art to choose the most effective inhibitor dosage for the particular salt solution composition and the specific temperature of use. In a variation of the aforementioned embodiment, the anti-corrosion effect is synergistically augmented by further addition of no more than 1 wt. %, preferably no more than 0.4 wt. % of a 1:20 weight per weight (w/w) solution of antimony chloride in propargyl alcohol. Here also, it is for those skilled in the art to choose the most effective inhibitor dosage for the particular salt solution composition and the specific temperature of use.

Salt solutions that are corrosion inhibited may be prepared by introducing and mixing the components in any order. For example, a process for the preparation of an inhibited brine may comprise introducing a concentrated aqueous or non-aqueous solution of some of the inhibiting compounds into the brine, or the process may also comprise introducing solids or liquids into the brine. One or more of the inhibiting compounds may serve as a solubilizing or suspending medium for one or more other inhibiting compounds.

In one particular embodiment of the present invention the corrosion inhibited salt solutions may comprise any of zinc bromide, zinc chloride, calcium bromide, calcium chloride and mixtures thereof, and any of the compositions detailed above.

The following Examples 1-7 demonstrate the synergistic effect observed in particular corrosion inhibiting mixtures introduced into zinc bromide and calcium bromide salt solutions and tested according to the above described procedure. The corrosion inhibiting components in these mixtures are selected from morpholine, antimony chloride or antimony bromide, propargyl alcohol, isoascorbic acid, hexamine, and selenium dioxide, and the mixtures tested, whether incorporating only part of the components or all, were compared to a reference example where no corrosion inhibiting compound is introduced.

The above-described procedure was employed with an 18.2 ppg (pounds per gallon) salt solution made of 44.3 wt. % zinc bromide and 25.8 wt. % calcium bromide. The coupons were of carbon steel C-4130, the temperature 350° F., the pressure 500 psi and the duration of exposure 168 hours.

The experiments which were designed to look for any Environment-Assisted Cracking (EAC) used U-bend coupons that were prepared as recommended in ASTM No. GM 58 from 309, 310 and 410 stainless steels and exposed for 1 week at 350° F. to the cited synergistically inhibited 18.2 ppg salt solution. No signs of cracking were observed on any of the mentioned coupons after aging.

EXAMPLE 1

Reference Example

Corrosion inhibition was first tested for a blank salt solution. The corrosion rate was 46.2 mpy.

Three components selected from morpholine, antimony compound, and propargyl alcohol were then tested separately. Table 1 herein shows that use of one component lowered the corrosion rate to 37-43 mpy. A small amount of antimony chloride (100-200 ppm) and propargyl alcohol resulted in a small decrease in the corrosion rate to 41-45 mpy. A larger amount of antimony bromide (500 ppm) and propargyl alcohol resulted in a larger decrease in the corrosion rate, to 30 mpy.

TABLE 1

| Corrosion Rate (mpy) | Morpholine (wt. %) | SbBr$_3$ (ppm) | SbCl$_3$ (ppm) | Propargyl Alcohol (wt. %) |
| --- | --- | --- | --- | --- |
| 46.2 | — | — | — | — |
| 42.5 | 0.25 | — | — | — |
| 37.0 | — | 2500 | — | — |
| 41.9 | — | — | — | 0.25 |
| 30.1 | — | 500 | — | 0.2 |
| 40.8 | — | — | 100 | 0.2 |
| 45.3 | — | — | 200 | 0.2 |

EXAMPLE 2

Three Components-Mixture

A three component mixture was tested for decrease in corrosion rate. The combination of morpholine+propargyl alcohol+isoascorbic acid had no effect on the corrosion rate but other combinations of three components resulted in decreases in the corrosion rate. Using antimony compounds together with either morpholine and propargyl alcohol, propargyl alcohol and isoascorbic acid, or morpholine and isoascorbic acid, resulted in significantly reduced corrosion rate values down to lower than 15 mpy, and in certain cases lower than 10 mpy, as can be appreciated from Table 2 below.

TABLE 2

| Corrosion Rate (mpy) | Morpholine (wt. %) | SbBr$_3$ (ppm) | SbCl$_3$ (ppm) | Propargyl Alcohol (wt. %) | Isoascorbic acid (wt. %) |
|---|---|---|---|---|---|
| 47.5 | 0.3 | — | — | 0.2 | 0.5 |
| 45.0 | 0.3 | — | — | 0.2 | 0.5 |
| 26.8 | 0.3 | — | 100 | 0.2 | — |
| 27.5 | 0.3 | — | 100 | 0.2 | — |
| 18.0 | — | — | 100 | 0.2 | 0.5 |
| 31.7 | — | — | 100 | 0.2 | 0.5 |
| 12.5 | 0.3 | 150 | — | — | 0.4 |
| 11.0 | 0.3 | 150 | — | — | 0.5 |
| 8.1 | 0.3 | 150 | — | — | 0.5 |
| 13.9 | 0.3 | 150 | — | — | 0.5 |
| 15.5 | 0.3 | 150 | — | — | 0.5 |
| 10.9 | 0.3 | 150 | — | — | 0.6 |
| 12.6 | 0.3 | — | 100 | — | 0.5 |
| 13.8 | 0.3 | — | 100 | — | 0.5 |
| 9.6 | 0.3 | — | 100 | — | 0.5 |
| 10.2 | 0.3 | — | 100 | — | 0.5 |

Based on the above results, the following conclusions regarding the above different combinations were drawn:

a) morpholine+propargyl alcohol+isoascorbic acid had little effect on the corrosion rate.

b) morpholine+antimony chloride+propargyl alcohol decreased the corrosion rate to 27-28 mpy.

c) antimony chloride+propargyl alcohol+isoascorbic acid decreased the corrosion rate to 18-32 mpy.

d) morpholine+antimony bromide or antimony chloride+isoascorbic acid decreased the corrosion rate to 8-16 mpy.

EXAMPLE 3

Four Components-Mixture

A four-component mixture, consisting of morpholine, antimony chloride, propargyl alcohol, and isoascorbic acid was tested and resulted in a very low corrosion rate (3-6 mpy).

TABLE 3

| Corrosion Rate (mpy) | Morpholine (wt. %) | SbCl$_3$ (ppm) | Propargyl Alcohol (wt. %) | Isoascorbic acid (wt. %) |
|---|---|---|---|---|
| 3.1 | 0.3 | 100 | 0.2 | 0.5 |
| 3.2 | 0.3 | 100 | 0.2 | 0.5 |
| 5.5 | 0.3 | 100 | 0.2 | 0.5 |
| 5.2 | 0.3 | 100 | 0.2 | 0.5 |

EXAMPLE 4

Use of Selenium Dioxide

The positive effect of selenium dioxide was tested alone and in a three component combination with antimony bromide and propargyl alcohol. Table 4 shows that the use of selenium dioxide by itself decreased the corrosion rate slightly to 40 mpy. The combination of selenium dioxide+antimony bromide+propargyl alcohol resulted in a much lower corrosion rate (11 mpy) than the combination of antimony bromide and propargyl alcohol (30 mpy).

TABLE 4

| Corrosion Rate (mpy) | SeO$_2$ (ppm) | SbBr$_3$ (ppm) | Propargyl Alcohol (wt. %) |
|---|---|---|---|
| 40.4 | 2500 | — | — |
| 42.5 | — | — | — |
| 37.0 | — | 2500 | — |
| 41.9 | — | — | 0.25 |
| 30.1 | — | 500 | 0.2 |
| 11.1 | 250 | 250 | 0.2 |

EXAMPLE 5

Four Components-Mixture

Four components, chosen from selenium dioxide, morpholine, antimony bromide, propargyl alcohol, and isoascorbic acid, were tested. The corrosion rate results are summarized in Table 5 below.

TABLE 5

| Corrosion Rate (mpy) | SeO$_2$ (ppm) | Morpholine (wt. %) | SbBr$_3$ (ppm) | Propargyl Alcohol (wt. %) | Isoascorbic acid (wt. %) |
|---|---|---|---|---|---|
| 8.7 | 100 | 0.2 | 150 | — | 0.4 |
| 17.0 | 150 | 0.2 | 150 | — | 0.4 |
| 9.6 | 250 | 0.2 | 250 | 0.2 | — |
| 10.4 | 100 | 0.2 | 150 | 0.2 | — |
| 6.9 | 100 | 0.2 | 150 | 0.2 | — |
| 17.2 | 50 | 0.15 | 120 | 0.2 | — |
| 19.4 | 50 | 0.15 | 120 | 0.2 | — |
| 15.3 | 50 | 0.15 | 120 | 0.2 | — |
| 35.0 | 50 | 0.15 | 45 | 0.2 | — |

The results for this set of tests may be summarized as follows:

Selenium dioxide+morpholine+antimony bromide+isoascorbic acid resulted in a corrosion rate of 9-17 mpy;

selenium dioxide+morpholine+antimony bromide+propargyl alcohol resulted in a corrosion rate decreasing from 35 mpy to 7 mpy, as amounts of morpholine and antimony bromide increased.

EXAMPLE 6

Five Components-Mixture

A five-component mixture consisting of selenium dioxide, morpholine, antimony bromide, propargyl alcohol, and isoascorbic acid was tested. Corrosion rates are summarized in Table 6, showing a low corrosion rate of 9.7 mpy, decreasing to a value as low as 3.5, when further adjusting morpholine and isoascorbic acid.

TABLE 6

| Corrosion Rate (mpy) | SeO$_2$ (ppm) | Morpholine (wt. %) | SbBr$_3$ (ppm) | Propargyl Alcohol (wt. %) | Isoascorbic acid (wt. %) |
| --- | --- | --- | --- | --- | --- |
| 9.7 | 100 | 0.2 | 150 | 0.2 | 0.15 |
| 3.5 | 100 | 0.15 | 150 | 0.2 | 0.4 |

EXAMPLE 7

Five Components-mixture, Introducing Hexamine

Hexamine was added to a four component mixture consisting of selenium dioxide, morpholine, antimony bromide, and propargyl alcohol. The corrosion rate decreased from 10.4 mpy to 5.7 mpy.

TABLE 7

| Corrosion Rate (mpy) | SeO$_2$ (ppm) | Morpholine (wt. %) | SbBr$_3$ (ppm) | Propargyl Alcohol (wt. %) | Hexamine (ppm) |
| --- | --- | --- | --- | --- | --- |
| 10.4 | 100 | 0.2 | 150 | 0.2 | — |
| 5.7 | 100 | 0.2 | 150 | 0.2 | 150 |

Summary

Summarizing the results obtained for the different combinations tested for corrosion inhibition, the following conclusions may be drawn (the mpy values relating to 350° F.):

Non-sulfur corrosion inhibitors for lowering the corrosion rate below 30 mpy may contain, for example, a) antimony compound, and propargyl alcohol; or b) antimony compound, propargyl alcohol, and morpholine; or c) antimony compound, propargyl alcohol, and isoascorbic acid.

The corrosion inhibitors for lowering the corrosion rate below 25 mpy may contain d) antimony compound, morpholine, and isoascorbic acid; e) antimony compound, propargyl alcohol, and selenium dioxide; or f) antimony compound, morpholine, selenium dioxide, and isoascorbic acid.

The corrosion inhibitors that can lower the corrosion rate below 10 mpy may contain g) antimony compound, propargyl alcohol, morpholine, and isoascorbic acid; or h) antimony compound, propargyl alcohol, morpholine, and selenium dioxide i) antimony compound, propargyl alcohol, Morpholine, selenium dioxide, and isoascorbic acid; or j) antimony compound, propargyl alcohol, morpholine, selenium dioxide, and hexamine.

Table 8 shows the above conclusions about corrosion rates, denoting the presence of a compound by 'x'. SbX$_3$ may be SbCl$_3$ or SbBr$_3$.

TABLE 8

| | Corrosion Rate (mpy) | SbX$_3$ | Propargyl Alcohol | Morpholine | Isoascorbic acid | SeO$_2$ | Hexamine |
| --- | --- | --- | --- | --- | --- | --- | --- |
| a | <30 | x | x | | | | |
| b | <30 | x | x | x | | | |
| c | <30 | x | x | | x | | |
| d | <20 | x | | x | x | | |
| e | <20 | x | x | | | x | |
| f | <20 | x | | x | x | x | |
| g | <10 | x | x | x | x | | |
| h | <10 | x | x | x | | x | |
| i | <10 | x | x | x | x | x | |
| j | <10 | x | x | x | | x | x |

Besides the above tested mixtures, aqueous salt mixtures with inhibitors according to prior art recipes were prepared but they either did not produce low corrosion rates or they showed disadvantageous features (such as undesired surface and interphase phenomena).

A skilled person will utilize the potential of the invention, which can provide an anticorrosive composition for various situations, taking into account the desired corrosion rate, phenomena other than corrosion, behavior of the inhibited brine, physical conditions during the intended use (temperature, pressure, additional chemical components from the environment, etc.), as well as other aspects, including economic, environmental, and safety aspects. For example, some specific applications will require very low mpy values, other may necessitate low costs while doing with relatively higher mpy values, taking advantage of flexibility enabled by the invention. Said variety of practical aspects will affect the selection of chemicals and their quantities effected according to the invention by a skilled person.

While examples of the invention have been described for purposes of illustration, it will be apparent that many modifications, variations and adaptations can be carried out by persons skilled in the art, without exceeding the scope of the claims.

The invention claimed is:

1. A liquid composition, in the form of a clear solution, comprising a high capacity aqueous carrier in which (i) 0.40-0.60% by weight of an antimony halide and (ii) morpholine or one or more 4-(2-hydroxyalkyl)morpholine derivatives are dissolved, wherein the solution further comprises (iii) 7-18% by weight straight chain primary alkenol having from 3 to 5 carbon atoms and (iv) 20-30% by weight (iso)ascorbic acid
wherein the water content of the composition is not less than 30% by weight.

2. A composition according to claim 1, which is a clear solution containing about 30-60% by weight water.

3. A composition according to claim 2, wherein the antimony halide is SbCl$_3$, the morpholine derivative is 4-(2-hydroxyethyl)morpholine and the alkenol is selected from group consisting of allyl alcohol (CH$_2$=CHCH$_2$OH), crotyl alcohol (CH$_3$CH=CHCH$_2$OH) and a mixture thereof.

* * * * *